Patented May 21, 1935

2,002,082

UNITED STATES PATENT OFFICE 2,002,082

ULTRA-VIOLET LIGHT TRANSPARENT GLASS AND METHOD OF MAKING THE SAME

Camille Dreyfus, New York, N. Y.

No Drawing. Application February 18, 1928, Serial No. 255,508

8 Claims. (Cl. 49—81)

This invention relates to the making of glass that is at least partially transparent to ultra-violet light.

An object of my invention is to produce a glass that is transparent or translucent to ultra-violet rays, in an economical manner.

A further object of my invention is to produce a laminated glass that does not shatter, which glass is at least partially transparent to ultra-violet rays. Further objects of my invention will appear from the following detailed description.

Ordinary glass of commerce, while transparent to the light rays of the wave lengths in the range of the visible spectrum, is opaque to light of the short wave lengths or ultra-violet light. Modern medical research has demonstrated that this ultra-violet light is of marked beneficial effect upon the human body, and therefore glass that is permeable to this light is very desirable for use from this point of view. Glass made of quartz is transparent to ultra-violet rays, but is so expensive that its wide use is not feasible.

In accordance with my invention, I prepare a laminated glass that is transparent or translucent, i. e. permeable or semi-permeable to ultra-violet light. This is done by securing one or more sheets of a cellulose derivative between two or more sheets of glass of high quartz content. The glass to be used in my invention may be made of pure quartz or silicon dioxide. However, the use of pure uartz glass is not necessary, since a glass containing merely a large proportion of quartz will serve the purpose of this invention for the reason set forth below.

The cellulose derivative used for the intermediate sheets may be cellulose nitrate or organic derivatives of cellulose, such as organic esters of cellulose or organic ethers of cellulose. Examples of organic esters of cellulose are cellulose acetate, cellulose formate, cellulose propionate and cellulose butyrate. Examples of cellulose ethers are methyl cellulose, ethyl cellulose and benzyl cellulose. These cellulose derivatives are transparent or translucent to ultra-violet light, so that the laminated glass made in accordance with my invention is permeable to the ultra-violet light.

In one mode of carrying out my invention, one, two or more sheets made of or containing the cellulose derivative, and made in any suitable manner, are cemented by heat or pressure or by means of any suitable adhesive, which does not prevent the passage of ultra-violet light or a cellulose derivative lacquer, etc., between two, three or more of the sheets of glass of as high quartz content as possible. The sheets of cellulose derivative may be secured to the glass by placing the same between the sheets of glass, and the whole united by means of a powder containing finely divided organic derivatives of cellulose and a suitable plastifier or softener uniformly distributed there-thru, which is placed upon the surfaces and pressed at elevated temperature.

Instead of using pre-formed sheets made of or containing cellulose derivatives, the following method of making the laminated glass may be used. One or more layers of a powder containing finely divided organic derivatives of cellulose and plastifier uniformly distributed there-thru, are placed between two or more sheets of glass of high quartz content. The amount of powder used will depend upon the desired thickness of the finished layer. The whole is pressed at a pressure of from about 300 to about 500 lbs. per square inch and at temperatures of about from 50° to 80° C. preferably 70° C., until the powder consolidates into a homogeneous and continuous layer between the surfaces of the glass. In order to make a strong union between the glass and the resulting layer of cellulose derivative, it is sometimes advisable to use special expedients to cause the layer of plastic composition to be retained to the surfaces of the glass. Thus it is well to make holes in the surfaces of the glass, the axes of which holes are preferably not at right angles to the surfaces of the glass to produce better locking effect. The holes may also be screw threaded. Instead of holes, the surfaces of the glass may have recesses or grooves of increasing cross section therein, so as to form undercut portions of the plastic material to lock the same onto the surfaces. It will be seen that when the layer of powder containing the organic derivatives of cellulose is pressed, it will fill the holes, recesses or grooves, and thus form anchors for the resulting sheet of plastic composition.

The preparation of the powder containing the finely divided organic derivatives of cellulose and plastifier is more fully described in the application for patent filed by Camille Dreyfus and George Schneider Serial No. 157,868 on Dec. 29, 1926.

Obviously the total thickness of the final laminated glass may be varied to meet any required use. Likewise the ratio of the thickness of the layer of cellulose derivative to the layer of glass may be varied. However, for reasons of economy, I prefer to use as thick a layer of material containing the cellulose derivative as possible. The cellulose derivatives are highly transparent to ultra-violet light, and therefore the use of thick layers does not materially affect the transparency of the laminated glass to ultra-violet light. Since the layer of sheet of cellulose derivative may be made thick enough to impart strength and toughness to the laminated glass, quite thin sheets of glass may be used for making the laminated product to give the required rigidity thereto. Because of the thinness of the glass required, pure quartz glass may be used, without raising the cost of the laminated product to a prohibitive amount. Moreover, since the laminated glass does not consist wholly of glass, the sheets of glass need not be of pure quartz, but merely of high quartz content, without cutting down the amount of transmitted ultra-violet rays to an abjectionable extent.

It will be seen that the laminated glass made in acordance with my invention is transparent or at least translucent to ultra-violet light, and is also non-shatterable. It is, therefore, applicable for use in conveyances such as automobiles, railroad coaches, etc. where a shatterless glass is required for safety, and also for use in buildings of all kinds such as hospitals, homes, etc. where glass that is transparent to ultra-violet light is desirable.

It is to be understood that the foregoing details are given merely by way of illustration and that many variations may be made therein without departing from the spirit of this invention.

Having described my invention, what I claim and desire to secure by Letters Patent is:

1. Method of making laminated glass that is at least partially pervious to ultra-violet light comprising interposing a layer of finely divided powder of a plastic composition containing a derivative of cellulose between sheets of glass of high quartz content and pressing at elevated temperatures to cause the powder to coalesce.

2. Method of making laminated glass that is at least partially pervious to ultra-violet light comprising interposing a layer of a finely divided powder of a plastic composition containing cellulose acetate between sheets of glass of high quartz content and pressing at elevated temperatures to cause the powder to coalesce.

3. An article of manufacture composed of superposed, firmly united sheets of transparent material, certain of said sheets being glass and others cellulosic in character, and all being permeable to ultraviolet light, in combination with a binder of clear lacquer also permeable to ultraviolet light.

4. An article of manufacture composed of superposed, firmly united sheets of transparent material, certain of said sheets being glass and others cellulosic in character, in combination with a binding substance, said sheets and binding substance all being permeable to ultraviolet light.

5. An article of manufacture composed of superposed sheets of transparent material, certain of said sheets being glass and others of cellulosic character, and all being permeable to ultraviolet light in combination with a cellulose binder also permeable to ultraviolet light for firmly uniting said sheets.

6. A composite transparent material comprising glass, a flexible cellulosic substance, and a cellulose binder between said glass and flexible substance, all permeable to ultraviolet light.

7. A composite transparent material comprising glass, a flexible transparent strengthening substance, and a cellulose ester binder, all firmly united and permeable to ultraviolet light.

8. A composite transparent material comprising glass, a flexible strengthening substance, and a binding agent for firmly uniting said glass and substance, all of which are permeable to ultraviolet light.

CAMILLE DREYFUS.